US009614403B2

(12) United States Patent
Yoshida et al.

(10) Patent No.: US 9,614,403 B2
(45) Date of Patent: Apr. 4, 2017

(54) RESIN MOLDED STATOR AND MANUFACTURING METHOD THEREOF

(71) Applicant: Nidec Techno Motor Corporation, Kyoto (JP)

(72) Inventors: Tatsuya Yoshida, Kyoto (JP); Satoru Yamamoto, Kyoto (JP); Yasuyuki Arai, Kyoto (JP)

(73) Assignee: NIDEC TECHNO MOTOR CORPORATION, Kyoto (JP)

( * ) Notice: Subject to any disclaimer, the term of this patent is extended or adjusted under 35 U.S.C. 154(b) by 371 days.

(21) Appl. No.: 14/487,249

(22) Filed: Sep. 16, 2014

(65) Prior Publication Data

US 2015/0084474 A1 Mar. 26, 2015

(30) Foreign Application Priority Data

Sep. 20, 2013 (JP) ................................ 2013-195589

(51) Int. Cl.

| H02K 1/04 | (2006.01) |
|---|---|
| H02K 1/16 | (2006.01) |
| B29C 45/14 | (2006.01) |
| H02K 1/14 | (2006.01) |
| H02K 5/08 | (2006.01) |

(Continued)

(52) U.S. Cl.
CPC ....... *H02K 1/165* (2013.01); *B29C 45/14639* (2013.01); *H02K 1/148* (2013.01); *H02K 5/08* (2013.01); *B29C 45/0046* (2013.01); *B29C 45/14221* (2013.01);

(Continued)

(58) Field of Classification Search
CPC ........ Y10T 29/49009; Y10T 29/49012; H02K 15/12; H02K 3/522
USPC ............. 310/43, 216.067–216.068, 216.078, 310/216.081, 216.088–216.089, 216.099, 310/216.135; 29/596, 598
See application file for complete search history.

(56) References Cited

U.S. PATENT DOCUMENTS

2005/0067912 A1* 3/2005 Murakami ............. H02K 1/148
310/216.043
2009/0284096 A1* 11/2009 Katagiri ................. H02K 1/148
310/216.001

(Continued)

FOREIGN PATENT DOCUMENTS

| JP | 62173959 A | 7/1987 |
|---|---|---|
| JP | 2001258186 A | 9/2001 |

(Continued)

*Primary Examiner* — Thanh Lam
(74) *Attorney, Agent, or Firm* — Cantor Colburn LLP

(57) ABSTRACT

A method for manufacturing a resin molded stator may include: preparing a straight winding core in which neighboring partial core backs are coupled by a joint; bending the core at joints and causing distal ends of teeth to face an outer peripheral surface of a core metal to obtain a core metal assembly including a stator mounted on the core metal, arranging the core metal assembly in a mold; injecting resin into the mold, covering windings with resin, curing the resin; and removing the stator from the mold and the core metal. The core metal may include a plurality of ribs projecting outward from the outer peripheral surface, the number of the ribs being between three and the number of the teeth. Each rib may extend parallel to a center axis, and each rib may be located in a gap between the distal ends of adjacent teeth.

14 Claims, 13 Drawing Sheets

(51) Int. Cl.
*B29L 31/34* (2006.01)
*B29C 45/00* (2006.01)

(52) U.S. Cl.
CPC .......... *B29C 2045/0027* (2013.01); *B29C 2045/14229* (2013.01); *B29C 2045/14237* (2013.01); *B29L 2031/34* (2013.01)

(56) References Cited

U.S. PATENT DOCUMENTS

| | | | | |
|---|---|---|---|---|
| 2013/0057106 A1* | 3/2013 | Sajikawa | .................. | H02K 3/18 310/208 |
| 2013/0076163 A1* | 3/2013 | Yu | ........................ | H02K 1/28 310/43 |
| 2013/0076200 A1* | 3/2013 | Jo | ........................ | H02K 15/022 310/216.135 |
| 2013/0099604 A1* | 4/2013 | Yu | ........................ | H02K 1/148 310/43 |

FOREIGN PATENT DOCUMENTS

| | | | |
|---|---|---|---|
| JP | 2003164080 A | 6/2003 |
| JP | 2004236500 A | 8/2004 |
| JP | 2004312790 A | 11/2004 |
| JP | 2008236921 A | 10/2008 |

\* cited by examiner

RESIN MOLDED STATOR AND MANUFACTURING METHOD THEREOF

CROSS REFERENCE TO RELATED APPLICATIONS

The present application claims priority under 35 U.S.C. §119 to Japanese Application No. 2013-195589, filed Sep. 20, 2013, the entire content of which is incorporated herein by reference.

BACKGROUND OF THE INVENTION

Field of the Invention

The present invention relates to a stator molded with a resin.

Background

Conventionally, a stator molded with a resin is sometimes provided in, for example, a brushless DC motor so as to protect the stator. As disclosed in Japanese Patent Laid-Open No. 2001-258186, an annular core formed by bending a straight stacked core is known as a core of the stator molded with a resin. The annular core, around which a winding is wound, is maintained in an annular shape in a mold, and further molded with a resin in the mold. At the time of molding, a core metal is inserted into an inner side of a plurality of teeth of the annular stator. A region other than distal end surfaces of the teeth is thereby covered with the resin.

However, a joint that exists at a bent position of the core has a low rigidity. Thus, when the resin is injected into the mold, the shape of the annular core may be slightly deformed upon receiving a force from a resin flow. When a circularity of the core or a pitch uniformity of the teeth is reduced, or a concentricity of the stator to a rotating section is deteriorated due to the deformation of the core, motor vibrations are increased.

Meanwhile, in Japanese Patent Laid-Open No. 2004-312790, an engagement recess is provided in each of centers of distal end portions of all teeth, and an engagement projection is also provided on an outer periphery of a core metal. When the core metal is inserted into an annular core, the engagement projection engages with the engagement recess. Accordingly, a pitch of the plurality of teeth is maintained at a predetermined interval when a resin is injected into a mold. An inner diameter of the teeth is also retained.

However, when all the teeth are engaged with the projections of the core metal as in the method of Japanese Patent Laid-Open No. 2004-312790 or the like, it takes time to assemble an assembly in which the core is arranged around the core metal. Alternatively, an extra jig or the like for facilitating assembling is required, or a skilled worker is required for assembling.

At least an embodiment of the present invention ensures the shape of a core without deteriorating workability when manufacturing a resin molded stator.

SUMMARY

A method for manufacturing a resin molded stator according to one embodiment of the present invention includes a step a), a step b), a step c), and a step d): a) preparing a straight winding core including a plurality of core elements, a plurality of joints, and a plurality of windings, the plurality of core elements being linearly arranged, the core elements each including a partial core back and a tooth, neighboring partial core backs of the partial core back being coupled together by one of the joints, and the windings being wound around the respective teeth; b) bending the straight winding core at the plurality of joints into an annular shape in which the plurality of teeth are directed radially inward and causing distal ends of the plurality of teeth to face an outer peripheral surface of a columnar core metal to thereby obtain a core metal assembly in which a stator is mounted on the core metal, and arranging the core metal assembly in a mold, or causing distal ends of the plurality of teeth to face an outer peripheral surface of a columnar core metal in a mold provided with the core metal to thereby obtain a core metal assembly in which a stator is mounted on the core metal, and locating the core metal assembly in the mold; c) injecting a resin into the mold, covering at least the windings of the respective teeth with the resin, and curing the resin; and d) removing the stator molded with the resin from the mold and the core metal, wherein the core metal includes a plurality of ribs that project radially outward from the outer peripheral surface, the number of the ribs being three or more and less than the number of the teeth, each of the plurality of ribs extends parallel to a center axis, and in the core metal assembly, each of the plurality of ribs is located in a gap between the distal ends of the teeth adjacent to each other.

At least an embodiment of the present invention is also directed to a resin molded stator.

In accordance with at least an embodiment of the present invention, the shape of the core can be ensured without deteriorating workability when manufacturing the resin molded stator.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

It is assumed herein that one side and the other side in a direction parallel to a center axis of a stator are referred to as an "upper side" and a "lower side", respectively. An upper-lower direction is defined for convenience of description, and does not necessarily correspond to a direction of gravity. The direction parallel to the center axis is referred to as an "axial direction". A radial direction with the center axis as a center is referred to simply as a "radial direction". A circumferential direction with the center axis as a center is referred to simply as a "circumferential direction".

Figure 1:
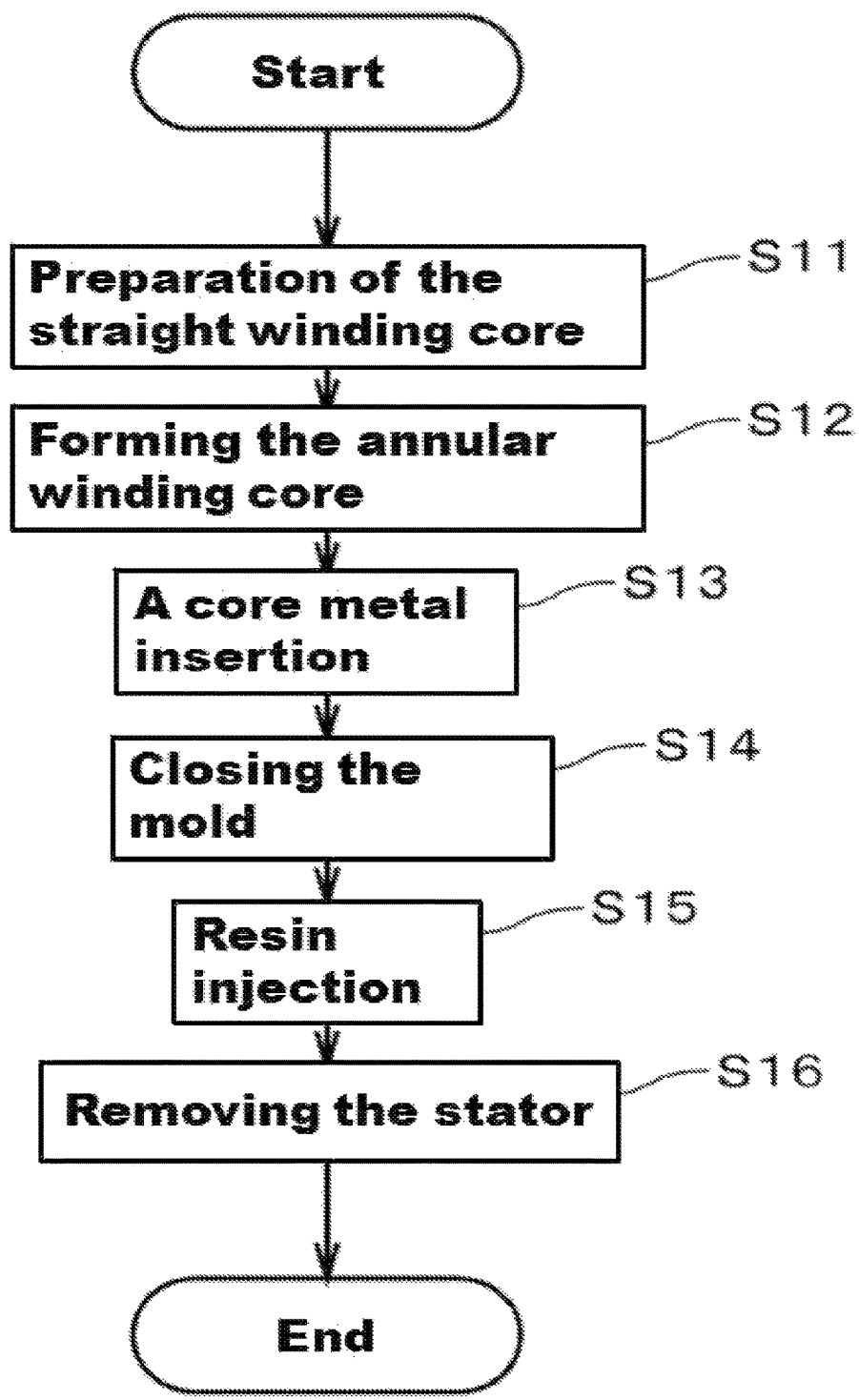
FIG. 1 is a view illustrating a manufacturing flow of a resin molded stator.

FIG. 1 is a view illustrating a manufacturing flow of a resin molded stator according to one embodiment of the present invention.

Figure 2:
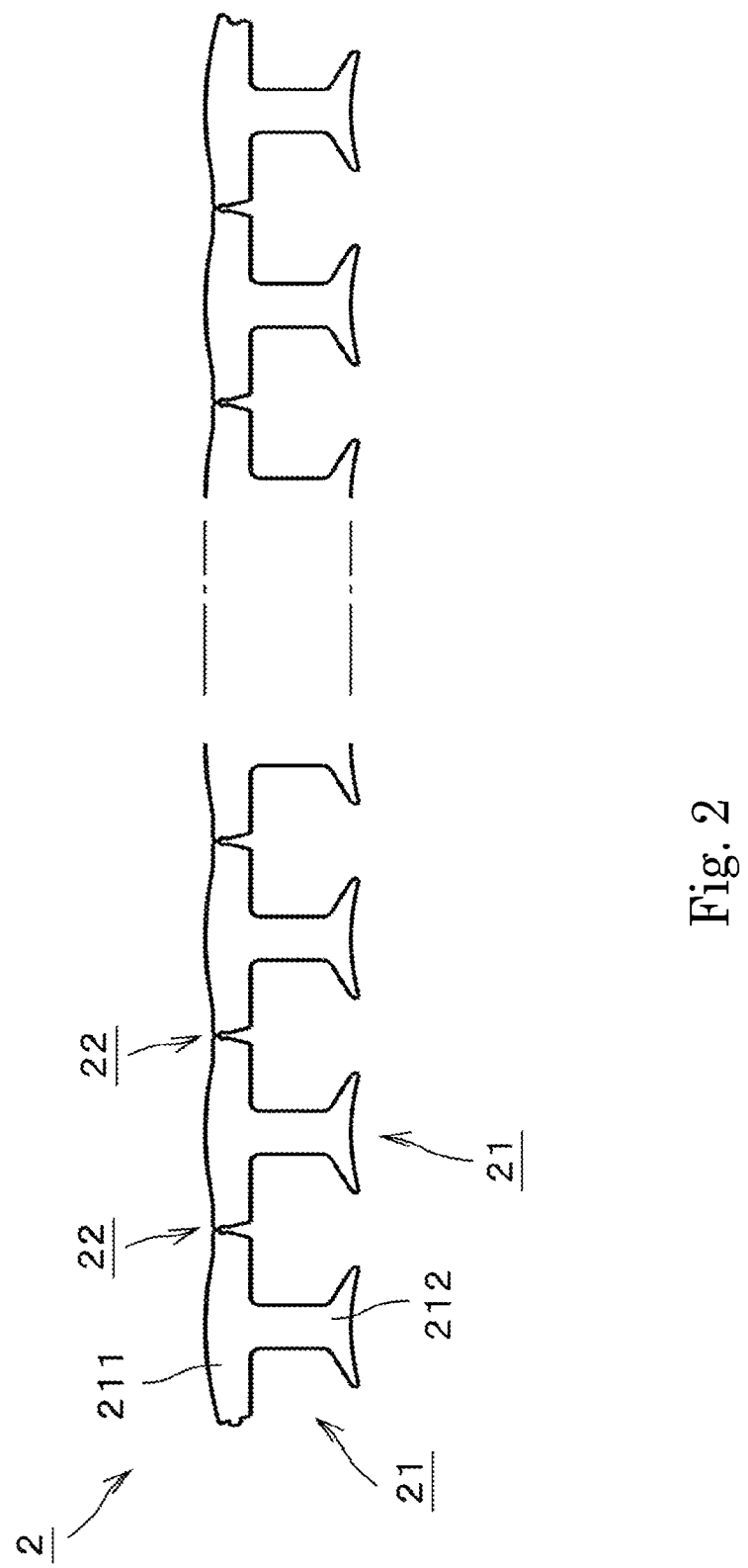
FIG. 2 is a plan view illustrating a straight core.

To manufacture the resin molded stator, first, punched pieces formed by punching steel plates with a die are stacked to prepare a straight core. FIG. 2 is a plan view illustrating a straight core 2. The straight core 2 includes a plurality of core elements 21 and a plurality of joints 22. The plurality of core elements 21 are linearly arranged. The core elements 21 each include a partial core back 211 and a tooth 212. A partial core back 211 is coupled to another partial core back 211 adjacent thereto by one of the joints 22. The joints 22 are located on both sides of each of the partial core backs 211 and on an opposite side from the teeth 212. The number of the joints 22 is smaller than the number of the partial core backs 211 by one.

When the straight core 2 is prepared, an insulator is fitted to each of the teeth 212. A conductive wire is wound around each of the teeth 212 via the insulator (step S11). In the following, the straight core, around which the winding is wound, is referred to as a "straight winding core". That is, the straight winding core includes at least the plurality of core elements 21, joints 22, and windings. The straight winding core is bent at the joints 22. Accordingly, the straight winding core is formed into an annular shape in which the plurality of teeth 212 are directed radially inward (step S12). Both end portions of the straight winding core are joined together.

In the following, the winding core having an annular shape is referred to as an "annular winding core". If necessary, another component is attached to the annular winding core. In the following, a component including the annular winding core immediately before molded with a resin is referred to as a "stator". A work performed on the stator in the following description is practically a work performed on the annular winding core.

Figure 3:
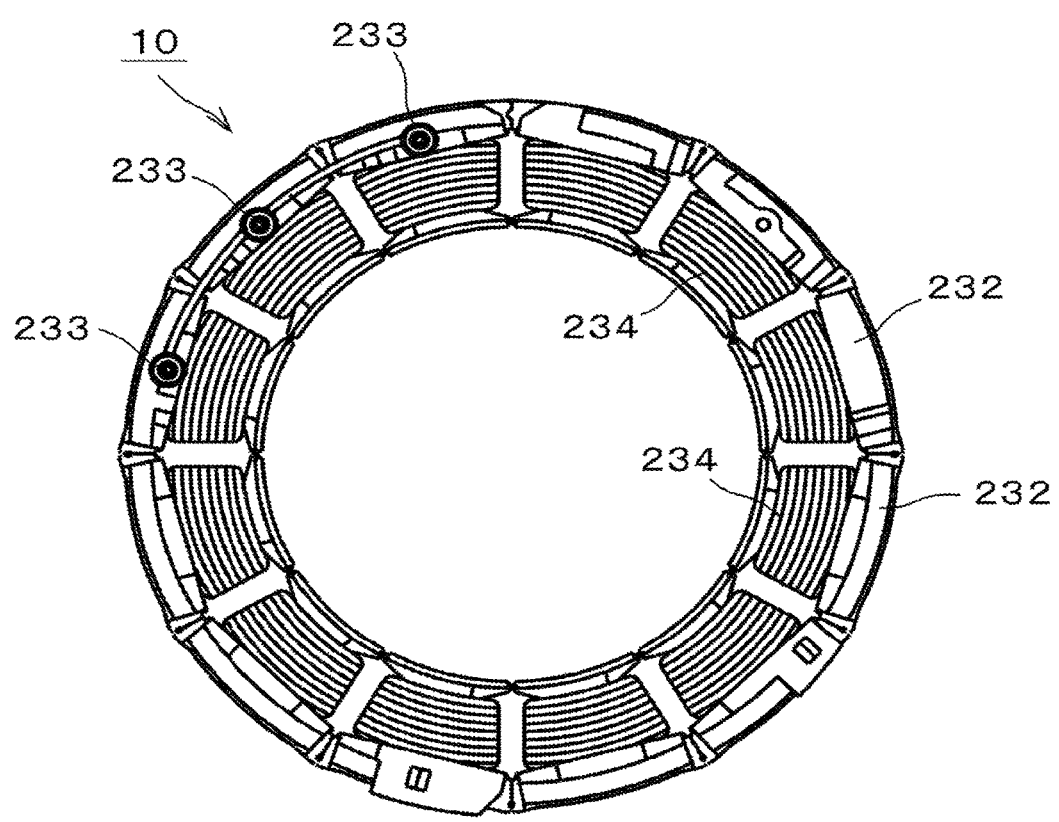
FIG. 3 is a plan view illustrating a stator.
Figure 4:
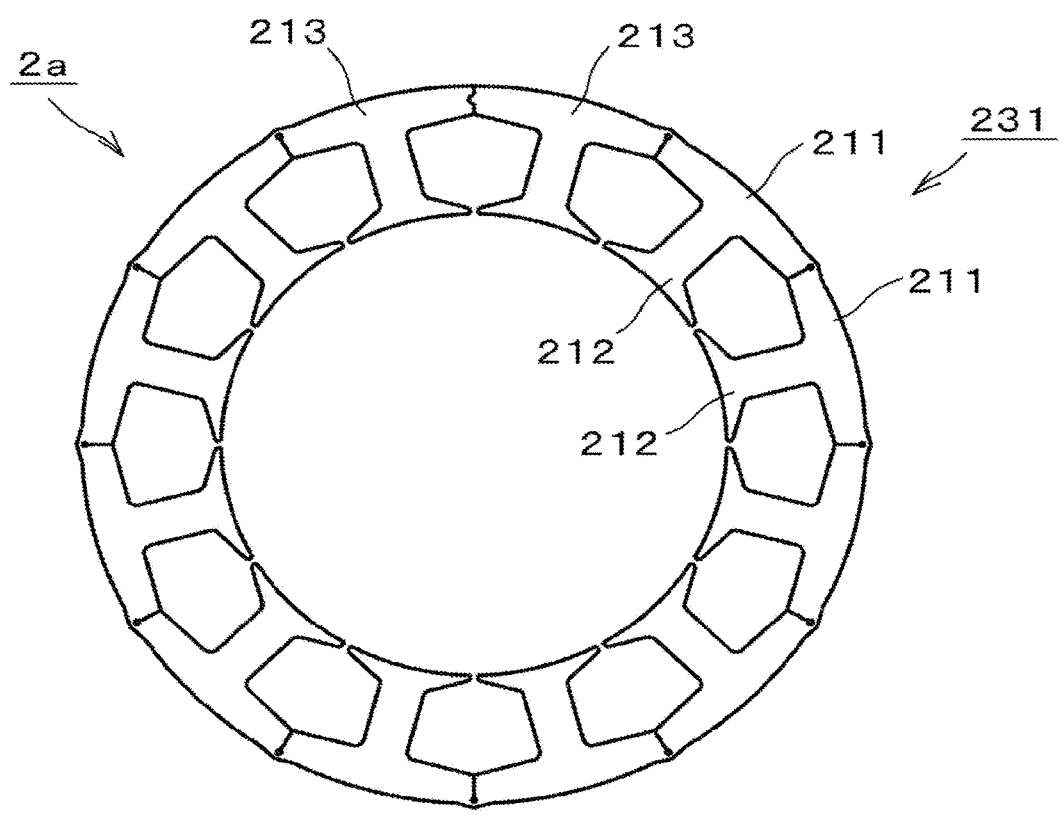
FIG. 4 is a plan view illustrating an annular core.

FIG. 3 is a plan view illustrating a stator 10. FIG. 4 is a plan view illustrating an annular core 2a in the stator 10. In the annular core 2a, the partial core backs 211 are annularly arranged. Partial core backs 213 located at the both ends of the straight core 2 are coupled together by welding or caulking. The plurality of partial core backs 211 constitute an annular core back 231. The plurality of teeth 212 extend radially inward from the core back 231. Three connection pins 233 are provided on insulators 232 of the stator 10. An end portion of the conductive wire forming a winding 234 is connected to the connection pins 233.

Figure 5:
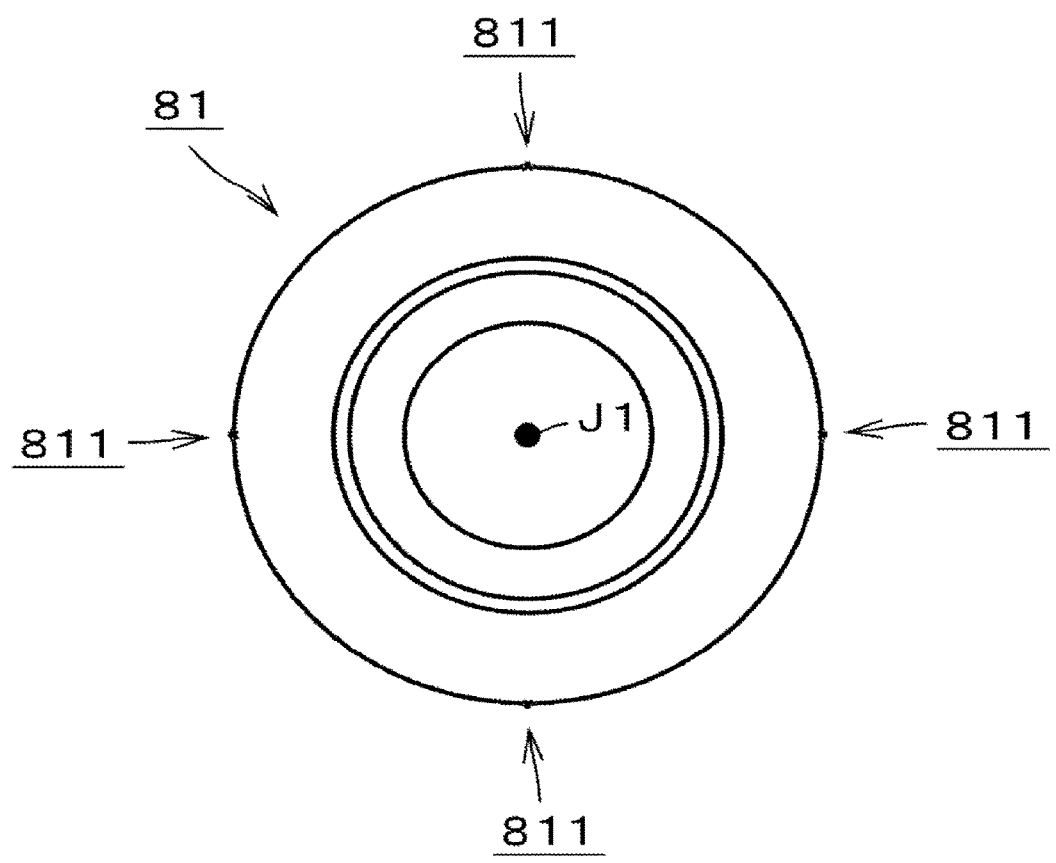
FIG. 5 is a plan view illustrating a core metal.
Figure 6:
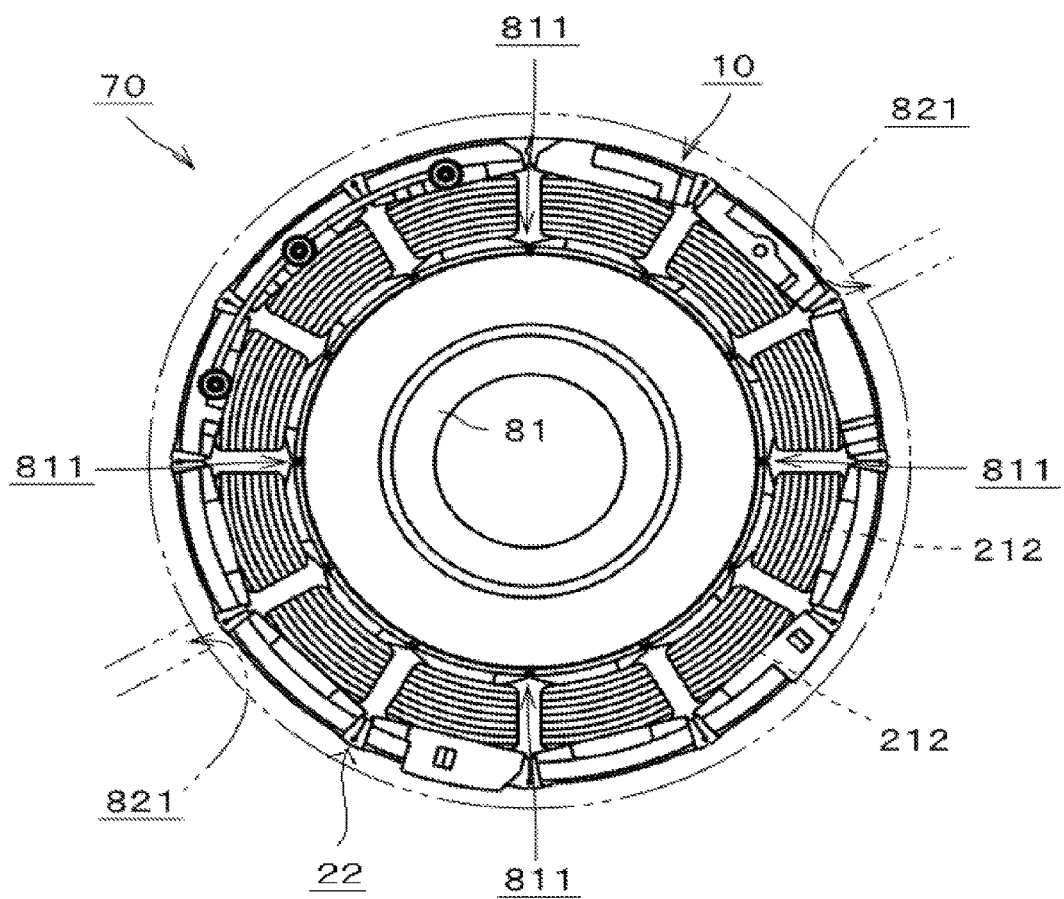
FIG. 6 is a plan view illustrating a core metal assembly.

Subsequently, a columnar core metal is inserted into the stator 10 (step S13). In other words, the core metal is inserted into the annular winding core. That is, the core metal is inserted into a space surrounded by the plurality of teeth 212 of the annular winding core. FIG. 5 is a plan view of a core metal 81. FIG. 6 is a plan view illustrating a state in which the core metal 81 is inserted into the stator 10. In the following, an assembly in which the stator 10 is mounted on the core metal 81 is referred to as a "core metal assembly 70". In the core metal assembly 70, distal ends of the plurality of teeth 212 face an outer peripheral surface of the core metal 81. To obtain the core metal assembly 70, the stator 10 may be attached to the core metal 81 by winding the annular winding core around the core metal 81.

The core metal assembly 70 is attached to a mold. When the mold is closed, the core metal assembly 70 is arranged in the mold (step S14). The core metal 81 may be also provided in the mold in advance. That is, the core metal 81 may be fixed to the mold in advance. In this case, the distal ends of the plurality of teeth 212 face the outer peripheral surface of the core metal 81. The stator 10 is mounted on the core metal 81 to form the core metal assembly 70. When the mold is closed, the core metal assembly 70 is located in the mold.

The core metal 81 includes four ribs 811 that slightly project radially outward from the outer peripheral surface. The respective ribs 811 extend parallel to a center axis J1 of the core metal 81. In the core metal assembly 70, the center axis J1 corresponds to a center axis of the stator 10. In the following description, the center axis of the stator 10 is also assigned the same reference character J1 as the center axis J1 of the core metal 81. In FIG. 6, an alternate long and two short dashes line on the outer periphery indicates an inner peripheral surface of a space formed by the mold.

Figure 7:
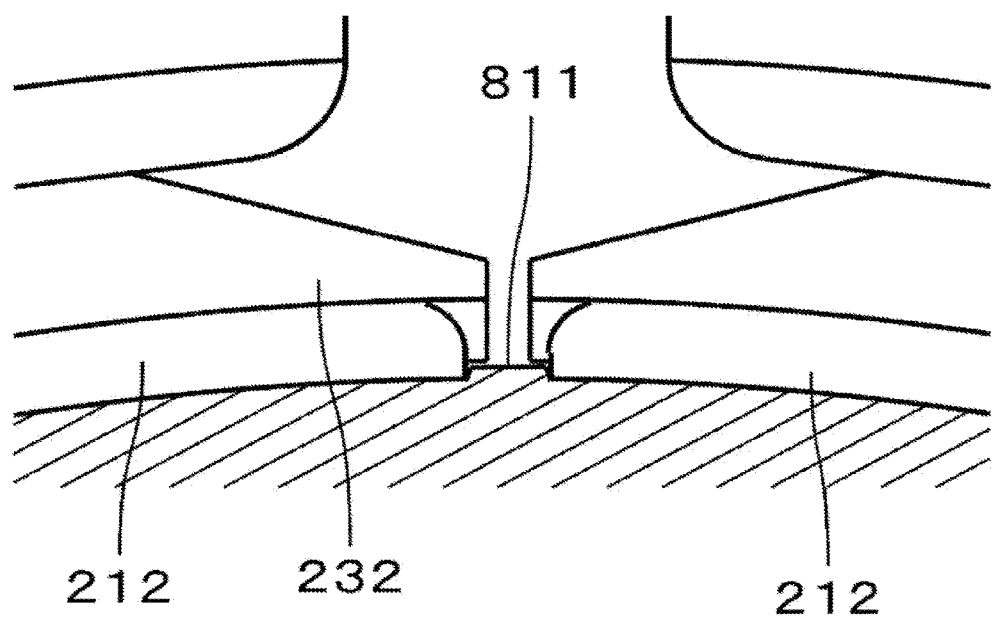
FIG. 7 is an enlarged view illustrating a region around a rib in the core metal assembly.
Figure 8:
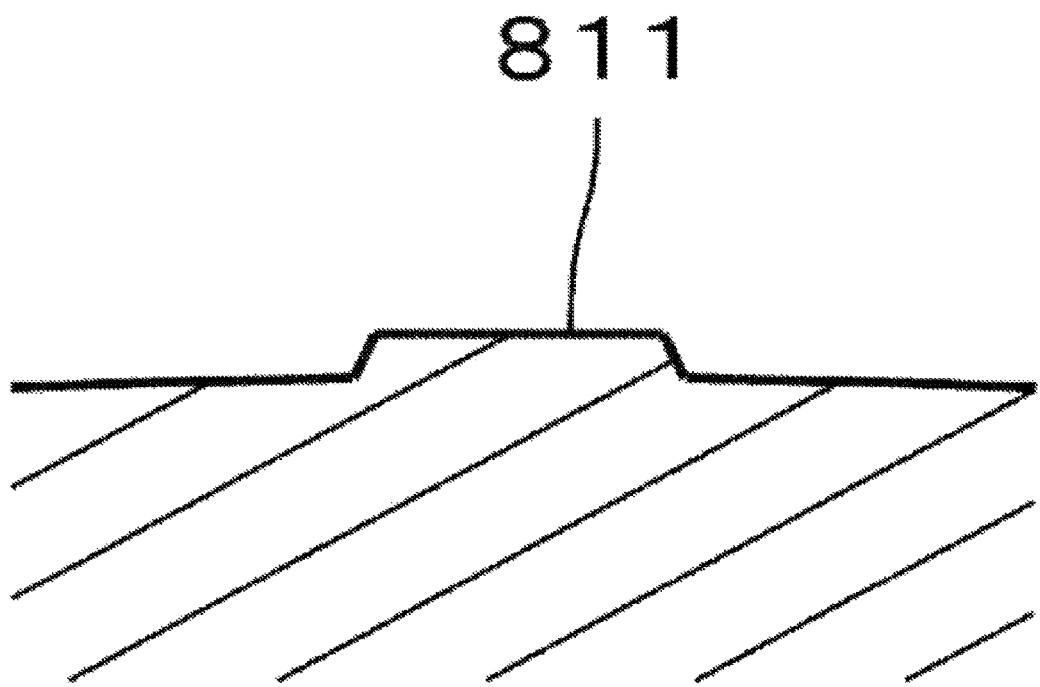
FIG. 8 is an enlarged cross sectional view illustrating the rib.

FIG. 7 is an enlarged view illustrating a region around one of the ribs 811 in the core metal assembly 70. The distal ends of the teeth 212 are exposed from the insulators 232. In the core metal assembly 70, each of the plurality of ribs 811 is located in a gap between the distal ends of the teeth 212 adjacent to each other. That is, a distance from the center axis J1 to a distal end of the rib 811 is longer than a distance from the center axis J1 to a circumferential end portion of a distal end surface of the tooth 212. FIG. 8 is an enlarged cross sectional view illustrating the rib 811. A circumferential width of each of the ribs 811 becomes smaller with distance from the center axis J1. Accordingly, side surfaces of the rib 811 serve as guide surfaces in positioning of the distal ends of the teeth 212. Consequently, a circularity of the annular winding core is corrected, and the core metal 81 is easily inserted into the annular winding core.

The circumferential width of the rib 811 at a base is slightly larger than a smallest circumferential width between the teeth 212. One of the side surfaces of the rib 811 is in contact with or close to one of the teeth 212. The other of the side surfaces of the rib 811 is in contact with or close to the other of the teeth 212.

After the core metal assembly 70 is arranged in the mold, a resin is injected into the mold (step S15). The circularity of the core and a concentricity of the core metal assembly 70 are maintained at the time of molding because of the existence of the ribs 811. The number of the ribs 811 may be three or more and less than the number of the teeth 212. The ribs 811 are preferably located at an even interval in the circumferential direction. Accordingly, the circularity of the core and the concentricity of the stator 10 to the core metal 81 are easily maintained at the time of molding.

The resin covers at least the windings of the respective teeth 212. Since the distal end surfaces of the teeth 212 are in contact with or close to the outer peripheral surface of the core metal 81, the distal end surfaces are not covered with the resin. After the resin cures, the mold is opened. The stator 10 molded with the resin is removed from the mold and the core metal 81 (step S16).

Figure 9:
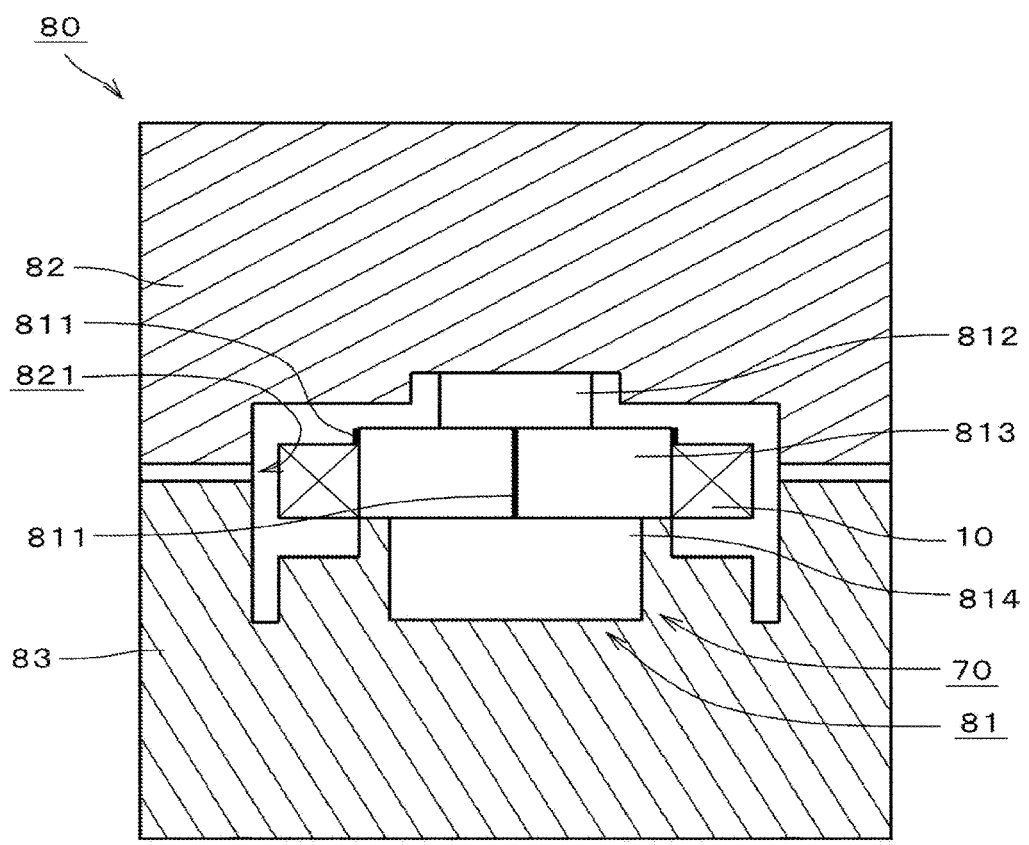
FIG. 9 is a longitudinal sectional view illustrating a state in which the core metal assembly is arranged in a mold.

FIG. 9 is a longitudinal sectional view illustrating a state in which the core metal assembly 70 is arranged in a mold 80. The core metal 81 may be considered as one portion of the mold 80. An upward direction from the lower side in FIG. 9 corresponds to a direction of plan view in FIG. 6. The mold 80 includes an upper half 82 and a lower half 83. A lower portion 814 of the core metal 81 is fixed to the lower half 83. An upper portion 812 of the core metal 81 is substantially in contact with the upper half 82 with the mold 80 closed. The stator 10 is attached to the outer peripheral surface of a center portion 813 of the core metal 81. The ribs 811 are provided in the center portion 813. In the core metal assembly 70, the respective ribs 811 exist in a portion at least from one axial end to the other axial end of the plurality of teeth 212. Accordingly, the ribs 811 stably support the teeth 212.

A resin injection port 821 that is a so-called gate is provided between the upper half 82 and the lower half 83. A groove is provided in the upper half 82 to form a flow path for the resin. As indicated by the alternate long and two short dashes line in FIG. 6, the injection port 821 is located between the ribs 811 and 811 in the circumferential direction. Moreover, the injection port 821 radially faces the joint 22. Accordingly, the resin gives a force to the core so as to widen a gap between the teeth 212 on both sides of the joint 22.

Figure 10:
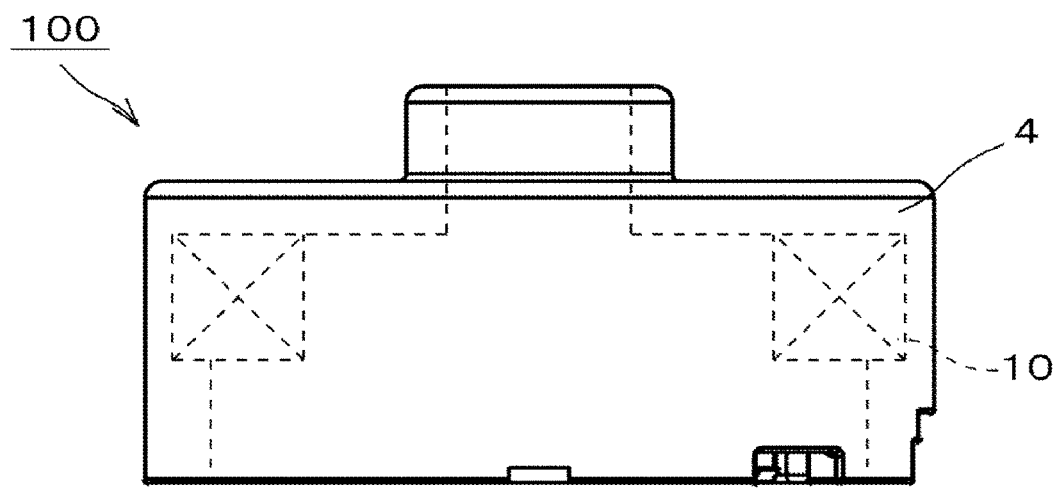
FIG. 10 is a front view illustrating a resin molded stator.
Figure 11:
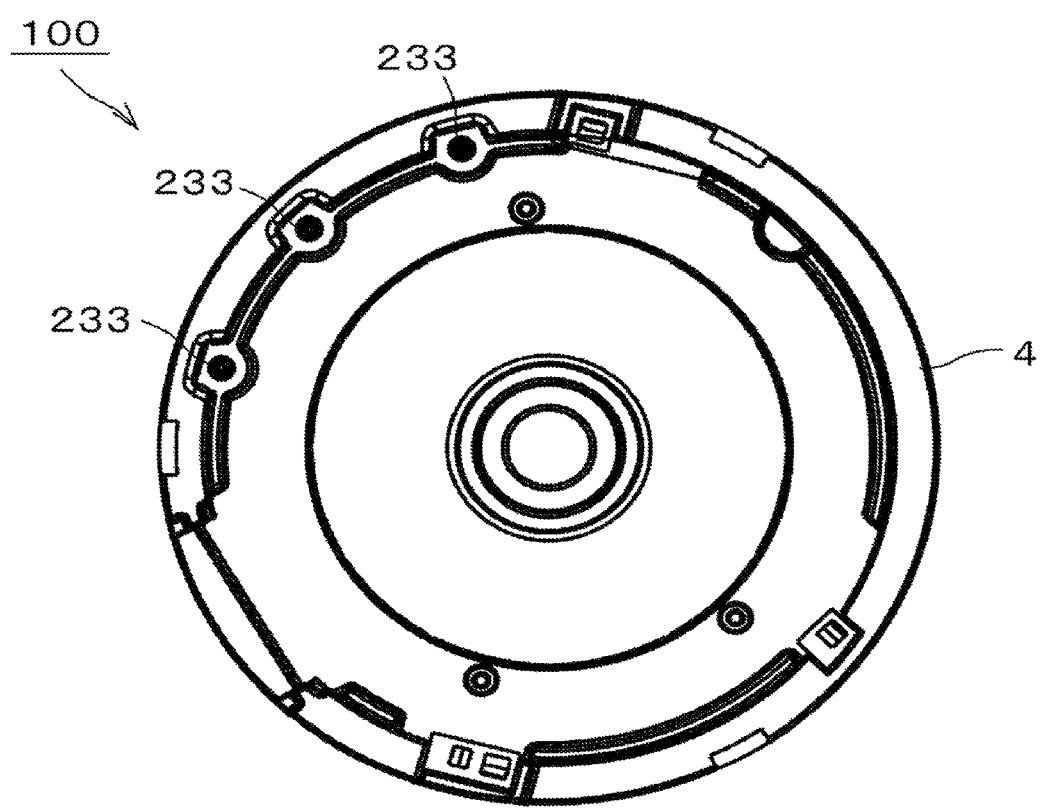
FIG. 11 is a bottom view illustrating the resin molded stator.
Figure 12:
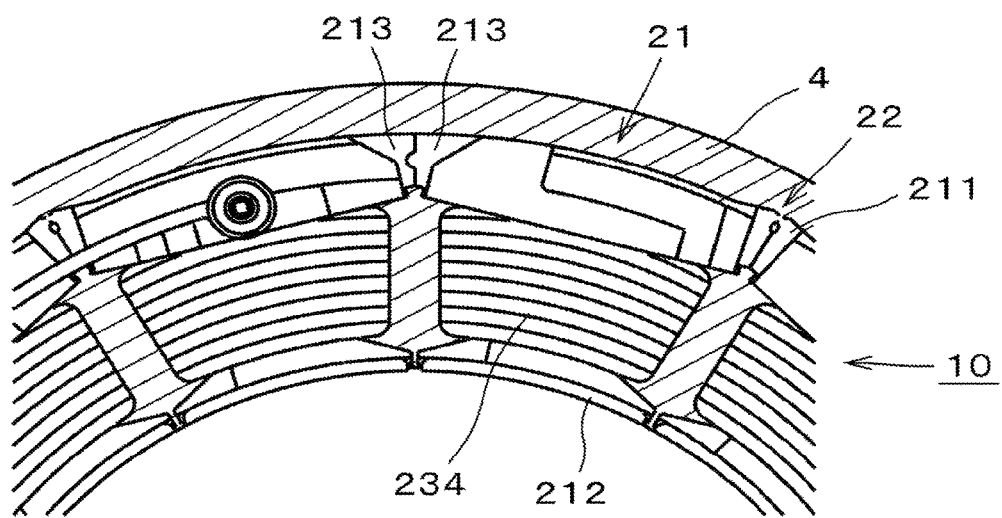
FIG. 12 is a view illustrating a cross section of a portion of the resin molded stator and a resin around the stator.

FIG. 10 is a front view illustrating a resin molded stator 100 removed from the mold 80. FIG. 11 is a bottom view of the resin molded stator 100. FIG. 12 is a view illustrating a cross section of a portion of the resin molded stator 100 and a mold resin 4 around the stator. The upper-lower direction in FIG. 10 corresponds to the upper-lower direction in FIG. 9.

The resin molded stator 100 includes the stator 10 including the annular winding core, and the mold resin 4. The mold resin 4 covers an almost entire portion of the stator 10 except for the distal end surfaces of the teeth 212. That is, the distal end surfaces of the plurality of teeth 212 are exposed from an inner peripheral surface of the mold resin 4. As long as the mold resin 4 covers at least the windings 234 of the annular winding core, the mold resin 4 may not cover the entire portion except for the distal end surfaces of the teeth 212. As already described, the annular winding core includes the plurality of core elements 21, the plurality of joints 22, and the plurality of windings 234. In the annular winding core, the core elements 21 are annularly arranged. The teeth 212 extend radially inward from the partial core backs 211.

In the plurality of core elements 21, neighboring partial core backs 211 of the partial core backs are coupled together by one of the joints 22 except for one position. Neighboring partial core backs 213 at the one position, i.e., the partial core backs 213 adjacent to each other in the center of FIG. 12 are coupled together by welding or caulking. As shown in FIG. 11, the connection pins 233 project from the mold resin 4.

Figure 13:
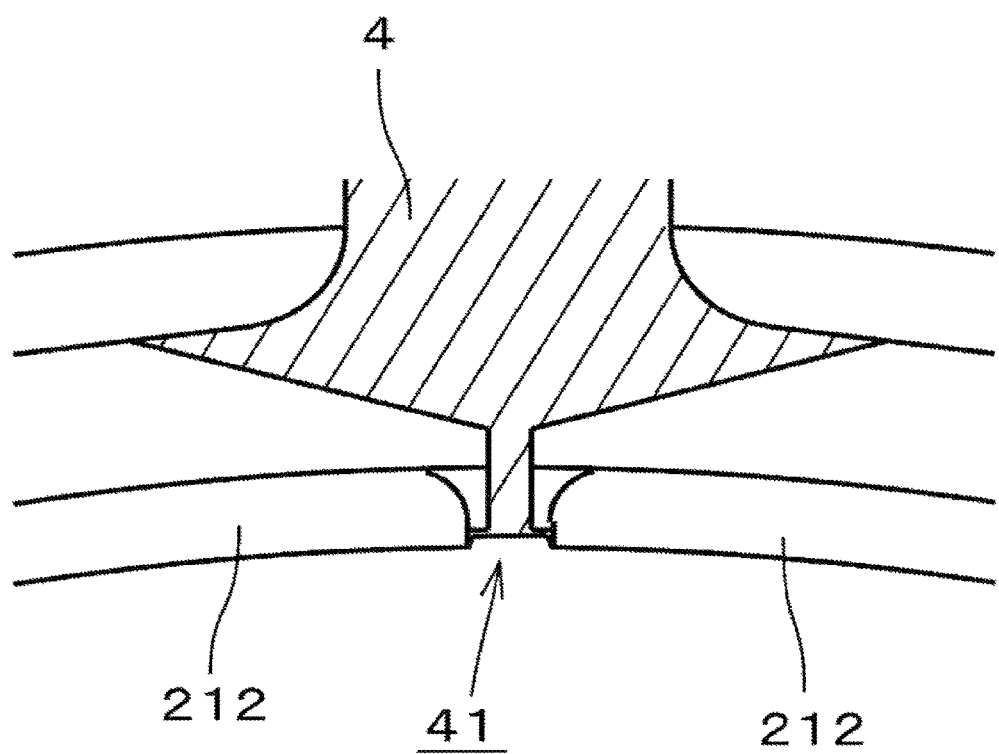
FIG. 13 is a cross sectional view illustrating a groove.

As shown in an enlarged view in FIG. 13, a groove 41 is formed in the inner peripheral surface of the mold resin 4 because of the existence of the rib 811 of the core metal 81. The groove 41 is depressed toward the gap between the distal ends of the teeth 212 adjacent to each other. The gap between the distal ends means a gap in disregard of the existence of the mold resin 4. In other words, a distance from the center axis J1 to a bottom surface of the groove 41 is longer than a distance from the center axis J1 to the circumferential end portion of the distal end surface of the tooth 212.

In the present embodiment, the number of the grooves 41 is four, which are located at an even interval in the circumferential direction. For example, in a case of a 12-slot core, the number of grooves is preferably 4, 6, or 3, which can be located at an even interval. In a case of a 24-slot core, the number of grooves is preferably 8, 12, or 6, which can be located at an even interval. The respective grooves 41 extend parallel to the center axis J1. The number of the grooves 41 is not limited to four, and may be three or more and less than the number of the teeth 212. The plurality of grooves 41 are preferably located at an even interval in the circumferential direction. The respective grooves 41 have the same shape as that of the ribs 811. A circumferential width of each of the grooves 41 becomes smaller with distance from the center axis J1.

The respective grooves 41 exist in a portion at least from one axial end to the other axial end of the plurality of teeth 212. The grooves 41 do not need to exist in the entire upper-lower direction of the innermost peripheral surface of the mold resin 4. For example, the grooves 41 may be formed continuously from one end in the upper-lower direction of the distal end surfaces of the teeth 212 to the other end of the innermost peripheral surface of the mold resin 4.

If the outer peripheral surface of the core metal is a perfect cylindrical surface, that is, if the ribs are not provided on the core metal, the positions of the teeth are determined with the distal end surfaces of the teeth aligned along the outer peripheral surface of the core metal. However, a small gap is provided between the distal end surfaces of the teeth and the outer peripheral surface of the core metal. Therefore, when the stator is molded with the resin, the positions of the teeth may move more than an allowable range upon receiving a force from the resin. In order to improve the circularity of the stator, it is necessary to extremely reduce a distance between the core metal and the distal end surfaces of the teeth. However, when the distance is reduced, it becomes difficult to insert the core metal into the stator.

On the other hand, when the resin molded stator 100 is manufactured, each of the ribs 811 of the core metal 81 is located between the distal ends of the teeth 212. Movement of the distal ends of the teeth 212 on both sides of each of the ribs 811 is thereby suppressed at the time of molding. As a result, the shape of the core of the stator 10 is ensured by the small number of ribs 811, thereby preventing motor vibrations and noise. By reducing the distance between the ribs 811 and the distal ends of the teeth 212, it becomes unnecessary to bring close the outer peripheral surface of the core metal 81 and the distal end surfaces of the teeth 212 to the limit in order to improve the circularity. A contact region in inserting the core metal 81 into the stator 10 is also reduced, so that a deterioration in workability is prevented. The method of the at least one embodiment of the present invention also permits that there exist one or more teeth 212 in which the distal ends are not fully positioned. In other words, the core metal assembly having one or more teeth 212 in which one or both of the opposite circumferential ends of each of the distal ends are not in contact with the ribs 811 is formed. In this case, the number of the ribs 811 is less than the number of the teeth 212. Accordingly, the deterioration in workability in inserting the core metal 81 into the stator 10 can be prevented.

When it is permitted that there exist one or more teeth 212 in which one or both of the opposite circumferential ends of each of the distal ends are not in contact with the ribs 811, positioning accuracy of the distal ends of the teeth 212 may be lowered. However, by positioning one of the opposite circumferential ends, or the distal ends of the adjacent tooth or the tooth 212 located beyond the adjacent tooth, the entire shape of the core metal assembly can be maintained in a state relatively close to an ideal shape.

The positions of the teeth 212 are held by locating the ribs 811 within the slots. Accordingly, a groove or a projection for engaging with the core metal 81 is not required at the distal ends of the teeth 212. When a groove or a projection is provided at the distal ends of the teeth 212, there is a risk that the resin adheres to the groove or the projection at the time of molding, and small resin pieces break away and fall into a motor after molding. However, a least an embodiment of the present invention can avoid the problem as well.

Since one rib 811 can substantially hold the positions of two teeth 212, the number of the ribs 811 is preferably equal to or less than half the number of the teeth 212. Of course, the number and positions of the grooves 41 of the resin molded stator 100 to be manufactured correspond to the number and positions of the ribs 811.

A rib having a height small enough not to enter between the distal ends of the teeth 212 may be further provided on the core metal 81. The rib is not included in the ribs 811 described above.

The ribs 811 may not exist at an even interval in the circumferential direction. Even in this case, the circularity of the core of the stator 10 can be ensured to some extent. The ribs 811 may also exist at an even interval in one portion of the circumferential direction, and at an uneven interval in the other portion of the circumferential direction. When the ribs 811 exist at an even interval, the circularity of the core can be easily ensured.

The straight core 2 may include two or more partial straight cores. In this case, the partial core backs 211 are coupled by welding or caulking at two or more positions so as to form the annular core. Generally speaking, the number of the joints 22 is smaller than the number of the core elements 21 by at least one.

The number of the teeth 212 is not limited to that described in the above embodiment, and may be changed variously. The number of the ribs 811 may be changed as appropriate according to the circularity to be ensured. For example, when the number of the teeth 212 is 12, the number of the ribs 811 can be selected from 3, 4, and 6. In a case in which the ribs 811 are not arranged at an even interval in the circumferential direction, the number of the ribs 811 can be more flexibly changed.

The outer shape of the mold resin 4 is not limited to the cylindrical surface. For example, the outer shape may be a surface having a prismatic shape. A separation direction of the mold is not limited to the upper-lower direction. The position to inject the resin is also not limited to the position described in the above embodiment. For example, the resin may be injected from upper and lower positions.

The configurations of the above embodiment and the respective modifications may be appropriately combined as long as there are no mutual inconsistencies.

The resin molded stator according to at least an embodiment of the present invention may be used as a stator of a motor for various uses such as a motor for home appliances, an industrial motor, and a power motor.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A method for manufacturing a resin molded stator, the method comprising:
   a) preparing a straight winding core comprising a plurality of core elements, a plurality of joints, and a plurality of windings,
   wherein the plurality of core elements are linearly arranged,
   the core elements each comprise a partial core back and a tooth,
   neighboring partial core backs of the partial core backs are coupled together by one of the joints, and
   the windings are wound around the respective teeth;
   b) bending the straight winding core at the plurality of joints into an annular shape in which the plurality of teeth are directed radially inward and
   causing distal ends of the plurality of teeth to face an outer peripheral surface of a columnar core metal to thereby obtain a core metal assembly in which a stator is mounted on the core metal, and
   arranging the core metal assembly in a mold, or
   causing distal ends of the plurality of teeth to face an outer peripheral surface of a columnar core metal in a mold provided with the core metal to thereby obtain a core metal assembly in which a stator is mounted on the core metal, and
   locating the core metal assembly in the mold;
   c) injecting a resin into the mold, covering at least the windings of the respective teeth with the resin, and curing the resin; and
   d) removing the stator molded with the resin from the mold and the core metal, wherein
   the core metal comprises a plurality of ribs that project radially outward from the outer peripheral surface, the number of the ribs being three or more and less than the number of the teeth,
   each of the plurality of ribs extends parallel to a center axis, and
   in the core metal assembly, each of the plurality of ribs is located in a gap between the distal ends of the teeth adjacent to each other.

2. The method for manufacturing a resin molded stator according to claim 1, wherein
   the step b) further comprises:
   obtaining an annular winding core by annularly bending the straight winding core; and
   inserting the core metal into the annular winding core.

3. The method for manufacturing a resin molded stator according to claim 1, wherein
   the plurality of ribs are located at an even interval in a circumferential direction.

4. The method for manufacturing a resin molded stator according to claim 2, wherein
   the plurality of ribs are located at an even interval in a circumferential direction.

5. The method for manufacturing a resin molded stator according to claim 1, wherein
   a circumferential width of each of the plurality of ribs becomes smaller with distance from the center axis.

6. The method for manufacturing a resin molded stator according to claim 2, wherein
   a circumferential width of each of the plurality of ribs becomes smaller with distance from the center axis.

7. The method for manufacturing a resin molded stator according to claim 1 wherein,
   each of the plurality of ribs exists in a portion at least from one axial end to the other axial end of the plurality of teeth in the core metal assembly.

8. The method for manufacturing a resin molded stator according to claim 2, wherein
   each of the plurality of ribs exists in a portion at least from one axial end to the other axial end of the plurality of teeth in the core metal assembly.

9. A resin molded stator comprising:
   an annular winding core; and an annular mold resin that covers at least a winding of the annular winding core, wherein the annular winding core comprises a plurality of core elements, a plurality of joints, and a plurality of windings, the plurality of core elements each comprise a partial core back and a tooth that extends radially inward from the partial core back, the plurality of core elements are annularly arranged, neighboring partial core backs of the partial core backs are coupled together by one of the joints except for at least one position, neighboring partial core backs at the at least one position are coupled together by welding or caulking, the windings are wound around the respective teeth, distal end surfaces of the plurality of teeth are exposed from an inner peripheral surface of the mold resin, and the inner peripheral surface of the mold resin comprises a plurality of grooves that are depressed toward a gap between distal ends of the teeth adjacent to each other, the number of the grooves being three or more and less than the number of the teeth and each of the plurality of grooves extending parallel to a center axis.

10. The resin molded stator according to claim 9, wherein the plurality of grooves are located at an even interval in a circumferential direction.

11. The resin molded stator according to claim 9, wherein a circumferential width of each of the plurality of grooves becomes smaller with distance from the center axis.

12. The resin molded stator according to claim 10, wherein a circumferential width of each of the plurality of grooves becomes smaller with distance from the center axis.

13. The resin molded stator according to claim 9, wherein each of the plurality of grooves exists in a portion at least from one axial end to the other axial end of the plurality of teeth.

14. The resin molded stator according to claim 10, wherein each of the plurality of grooves exists in a portion at least from one axial end to the other axial end of the plurality of teeth.

* * * * *